US010532417B2

(12) United States Patent
Meckler

(10) Patent No.: US 10,532,417 B2
(45) Date of Patent: Jan. 14, 2020

(54) DUAL BATTERY HYBRID ENGINE DRIVE WELDING POWER SUPPLY

(71) Applicant: Lincoln Global, Inc., City of Industry, CA (US)

(72) Inventor: Andreu P. Meckler, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 675 days.

(21) Appl. No.: 15/230,587

(22) Filed: Aug. 8, 2016

(65) Prior Publication Data

US 2018/0036823 A1 Feb. 8, 2018

(51) Int. Cl.
*B23K 9/10* (2006.01)
*H02J 7/00* (2006.01)

(52) U.S. Cl.
CPC .......... *B23K 9/1062* (2013.01); *B23K 9/1075* (2013.01); *H02J 7/0021* (2013.01)

(58) Field of Classification Search
CPC .. B23K 9/1006; B23K 9/1012; B23K 9/1043; B23K 9/1062; B23K 9/1075; B60W 10/26; B60W 20/10; B60W 20/13; H02J 7/0021
USPC .......................................................... 219/133
See application file for complete search history.

(56) References Cited

U.S. PATENT DOCUMENTS

| | | |
|---|---|---|
| 2,425,183 A | 8/1947 | Hall |
| 3,621,177 A | 11/1971 | Mcpherson |
| 3,808,397 A | 4/1974 | Wixson |
| 4,093,845 A | 6/1978 | Hairgrove, Sr. |
| 4,119,830 A | 10/1978 | Gilliland |
| 4,151,396 A | 4/1979 | Veal |
| 4,216,367 A | 8/1980 | Risberg |
| 4,467,174 A | 8/1984 | Gilliland |
| 4,508,954 A | 4/1985 | Kroll |
| 5,406,050 A | 4/1995 | Macomber |
| 5,990,446 A | 11/1999 | Zhang |
| 6,075,255 A | 6/2000 | Liao |
| 6,103,994 A | 8/2000 | Decoster |
| 6,570,132 B1 | 5/2003 | Bruner |
| 6,720,678 B2 | 4/2004 | Green |
| 6,781,095 B2 | 8/2004 | Hayes |
| 6,855,912 B2 | 2/2005 | Houston |
| 6,906,285 B2 | 6/2005 | Zucker |
| 6,933,467 B2 | 8/2005 | Hayes |
| 6,982,398 B2 | 1/2006 | Albrecht |
| 7,180,029 B2 | 2/2007 | Ott |

(Continued)

FOREIGN PATENT DOCUMENTS

| | | |
|---|---|---|
| EP | 1500456 A1 | 1/2000 |
| EP | 0983818 A2 | 3/2000 |

OTHER PUBLICATIONS

Extended European Search Report from Corresponding Application No. EP 17001350.2-1016; dated Jan. 11, 2018.

*Primary Examiner* — Dana Ross
*Assistant Examiner* — Joseph W Iskra

(57) ABSTRACT

Embodiments of the present invention are directed to a combustion engine power generation device, such as an engine driven welder, which utilizes a first battery for engine start and providing operational power when the system is off, and a second high storage battery to provide all operational power so long as the second battery has the stored energy to supply the needed power. In an embodiment, the first battery is a lead acid battery and the second battery is a lithium ion battery.

19 Claims, 3 Drawing Sheets

(56) References Cited

U.S. PATENT DOCUMENTS

| | | |
|---|---|---|
| 7,205,503 B2 | 4/2007 | Reynolds |
| 7,247,814 B2 | 7/2007 | Ott |
| 7,294,808 B2 | 11/2007 | Furman et al. |
| 7,307,241 B2 | 12/2007 | Hayes |
| 7,952,051 B2 | 5/2011 | Veik |
| 8,779,329 B2 | 7/2014 | Rappl |
| 2005/0263513 A1 | 12/2005 | Leisner et al. |
| 2006/0138113 A1 | 6/2006 | Ott |
| 2007/0080154 A1 | 4/2007 | Ott |
| 2007/0114216 A1 | 5/2007 | Ott |
| 2008/0035621 A1 | 2/2008 | Veik |
| 2008/0116186 A1 | 5/2008 | Luck |
| 2014/0054276 A1 | 2/2014 | Albrecht |
| 2014/0144900 A1 | 5/2014 | Beeson |
| 2014/0263238 A1 | 9/2014 | Ulrich |
| 2014/0263245 A1 | 9/2014 | Ulrich |
| 2015/0073684 A1* | 3/2015 | Renner .................... B60P 3/14 701/112 |
| 2015/0239411 A1* | 8/2015 | Nakajima ............. B60R 16/033 307/10.6 |
| 2017/0036290 A1* | 2/2017 | Enyedy ................ B23K 9/1006 |
| 2017/0036291 A1 | 2/2017 | Enyedy et al. |

\* cited by examiner

DUAL BATTERY HYBRID ENGINE DRIVE WELDING POWER SUPPLY

TECHNICAL FIELD

Devices, systems, and methods consistent with embodiments of the present invention relate to hybrid engine drive welders, and more specifically to dual battery hybrid engine drive welders having increased versatility and performance.

BACKGROUND

The construction and use of engine driven welders is well known. Such welders are often used when utility power grids are either not available or not reliable. In such welders, an engine and generator combination are used to generate power which is used by an output circuit to generate an output power. In an effort to improve on these systems, hybrid engine drive welders have been developed where the welder includes an energy storage device, such as a battery. The battery can be used by the welding system to add to the output power of the system and/or smooth the power provided by the generator to the output circuit—among other uses. Such systems are known and often referred to as hybrid engine drive welders. While advancements have been made for such welding systems to improve their utilization and performance, these systems still have disadvantages. Thus, improvements are needed to increase the reliability performance and versatility of hybrid engine drive welding systems.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a hybrid engine drive welder which uses a first energy storage device to start an engine of the welder, and a second energy storage device, which can be a lithium ion battery, to provide power for all other power loads for the welder, including internal power demands of the welding system. Further, the welder has multiple modes of operation depending on the load demand on the second energy storage device, and varies the usage of the engine based on the different mode of operation.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to hybrid engine drive welders using a gas or diesel powered engine to power a generator, which generates power for a welding operation. Further, exemplary welders can also generate auxiliary power which can be used to power accessories connected to the welder. Further, exemplary embodiments can use the generator power to provide energy to an energy storage device (e.g., a battery) which can store energy and provide that energy to the output power of the welder as needed. However, exemplary embodiments of the present invention are not limited to power supplies which provide a welding power but can also be used to provide a cutting power or any other power as desired.

Figure 1:
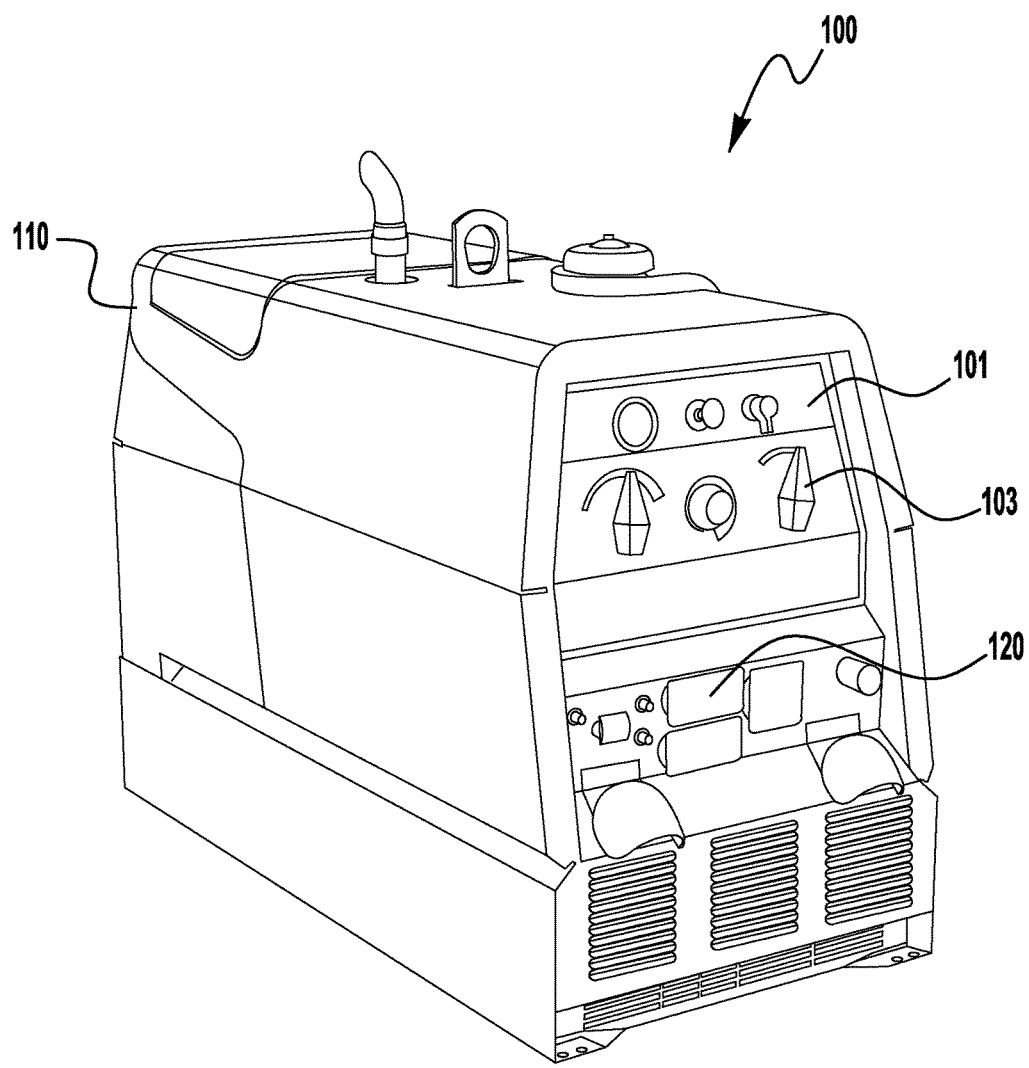
FIG. 1 is a diagrammatical representation of an exemplary hybrid engine drive welder.

Turning now to FIG. 1, an exemplary embodiment of an engine driven welder is shown. Of course, the embodiment shown is intended to be merely exemplary and not limiting in any way. As shown, the welder 100 has a housing 110 which encloses the internal components of the welder 100. The welder 100 has a front face 101, on which user input controls 103 are located. The input controls 103 are used to input various operation parameters, monitor system functions, and control the operation of the system 100. Also included on the welder 100 are output outlets 120. The outlets 120 can include connections for welding/cutting cables, auxiliary power outlets providing either 110 VAC or 220 VAC power, or any other type of output power they may be desired to be coupled to the system 100. The general construction, operation and function of hybrid engine drive welders is known and need not be described in detail herein.

Figure 2:
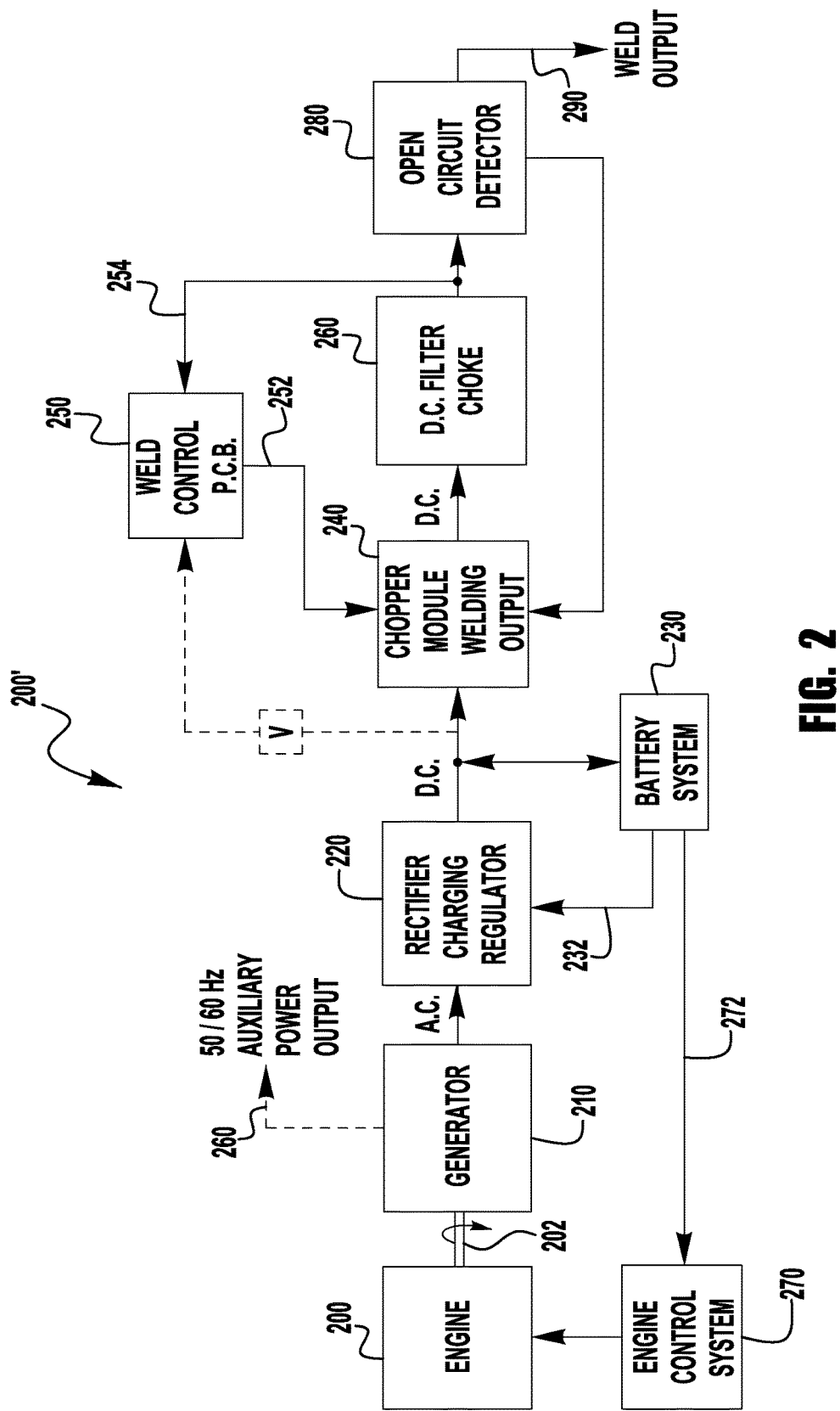
FIG. 2 is a diagrammatical representation of an electrical system of an exemplary hybrid engine drive welder.

Turning now to FIG. 2, an exemplary embodiment of an engine drive welding system 200' having an engine-hybrid design. It should be noted that the configuration shown in FIG. 2 represents an exemplary system 200 to show and describe an overall construction and operation of an engine drive-hybrid system. The overall functionality and structure of the system shown in FIG. 2 can be used with embodiments described herein with respect to FIG. 3.

As shown in FIG. 2, engine 200 drives the electric generator 210 via a drive shaft 202. The electric generator generates an AC current which is rectified by the rectifier charging regulator 220. As illustrated in FIG. 2, electric generator 210 also can supply power to an auxiliary power output 260 for AC current. In addition, the AC current from generator 210 can be rectified and be partially directed to an auxiliary DC power output, not shown. The DC current from rectified charger regulator 220 is directed into battery system 230 to charge the battery when a feedback signal 232 indicates that the battery needs to be and/or is available for charging. The DC current supplied from the battery of battery system 230 is directed into a chopper module welding output 240 which is used to form the desired current waveform during an arc welding process. The D.C. current from the rectified charge regular 220 can also be directly fed in the chopper module welding output 240. As such the D.C. current from the rectified charge regular 220 can be used to only charge battery system 230 or be used to both charge battery system 230 and supply current to chopper module welding output 240.

An engine control system 270 is provided to control the operation of engine 200. The engine control system receives a signal via line 272 from the battery system, which signal is representative of the charge on the battery system. When the battery system is fully charged, the engine control system slows or turns off engine 200. When the battery system is less than fully charged and/or below a predefined charge level, the engine control system causes the engine to increase in speed and/or be turned on.

Weld control 250 controls the chopper welding output via signal 252 based upon output current information received via line 254. FIG. 2 also illustrates that weld control 250 can additionally receive voltage information from the DC current being directed from battery system 230 to chopper module welding output 240. The DC current from the chopper welding output is directed into a DC filter choke 260 to smooth out the DC current used for forming the welding arc.

An open circuit detector 280 is provided to determine whether an arc is being formed or is about to be formed between the electrode and workpiece during a welding operation. When open circuit detector 280 does not detect an arc, the open circuit detector causes the chopper module 240 to turn off, thereby reducing a drain of power from the battery system. In one non-limiting design, the voltage level between the workpiece and electrode is monitored to determine the current state of the arc.

As illustrated in FIG. 2, all the current directed to the weld output is supplied by battery system 230. In order for the battery system 230 to supply the total current to the weld output 290, the size of the battery system is selected to have an adequate amp-hour size which can supply the maximum power rating of the welder for a sufficient period of time. Typically, the duty cycle for most manual stick welding is about 20-40%. As a result, during a period of about 10 minutes, an electric arc is generated for only two to four minutes. The size and amp rating of the battery system 230 must be sufficient to at least supply a full amount of power to the electric arc during this duty cycle in order to obtain a proper electric arc during an arc welding process. During the time that an electric arc is not generated, the rectifier charging regulator 220 directs DC current into battery system 230 to recharge the depleted battery system. It is desirable to select a battery which can rapidly recharge so that during the intermittent periods of time wherein an electric arc is not being generated, the battery can be rapidly recharged so that it will be able to generate an electric arc during a subsequent duty cycle. Typically, the amp-hour size of the battery is selected so as to provide the arc welding requirements for the maximum welding output rating of the welder for at least about one minute, and typically about 5-45 minutes.

As can be appreciated from the design and operation of the hybrid energy source for welder A, the size of engine 200 and electric generator 210 need not be sized to provide the maximum welding output rating of the welder. The size of engine 200 and electric generator 210 only needs to be sufficiently sized to provide enough current to the battery of battery system 230 to adequately recharge the battery after the battery has been partially discharged when forming an electric arc. For instance, if the maximum welding output rating of a welder is 10 kW of power, and the maximum average duty cycle for a welding operation is 40%, the engine and electric generator only needs to produce sufficient current to supply 40% of the maximum welding output rating since only this much current is being discharged by the battery system during a particular duty cycle for the welder. As a result, the size of the engine and the size of the electric generator can be significantly decreased by using the hybrid energy source of the present invention. In addition to the cost savings associated with using a smaller engine and electric generator, the efficiency rating for the use of the current generated by the electric generator is significantly increased since most of the current is used to recharge the battery after it has been partially discharged during the formation of an electric arc. In the past, only 20-40% of the current generated by the electric generator was used in welding operations when the duty cycle was about 20-40%. In addition to the increase in energy usage efficiency, the size of the motor needed to provide sufficient power to meet the maximum welding output rating of the welder is decreased since a smaller engine is needed to power the hybrid energy source. Another benefit of the hybrid energy source is the ability of the welder to generate a welding current without having to operate engine 200 and electric generator 210. When battery system 230 is fully charged, the battery system has an adequate amp-hour size to provide the welding arc requirements during a particular period of time. As a result, the welder can be used in locations where the running of an engine powered welder is unacceptable due to noise and/or engine exhaust issues. As shown in FIG. 2, the battery system 230 provides power to the DC buss for welding power as well as providing power to the engine control system.

Figure 3:
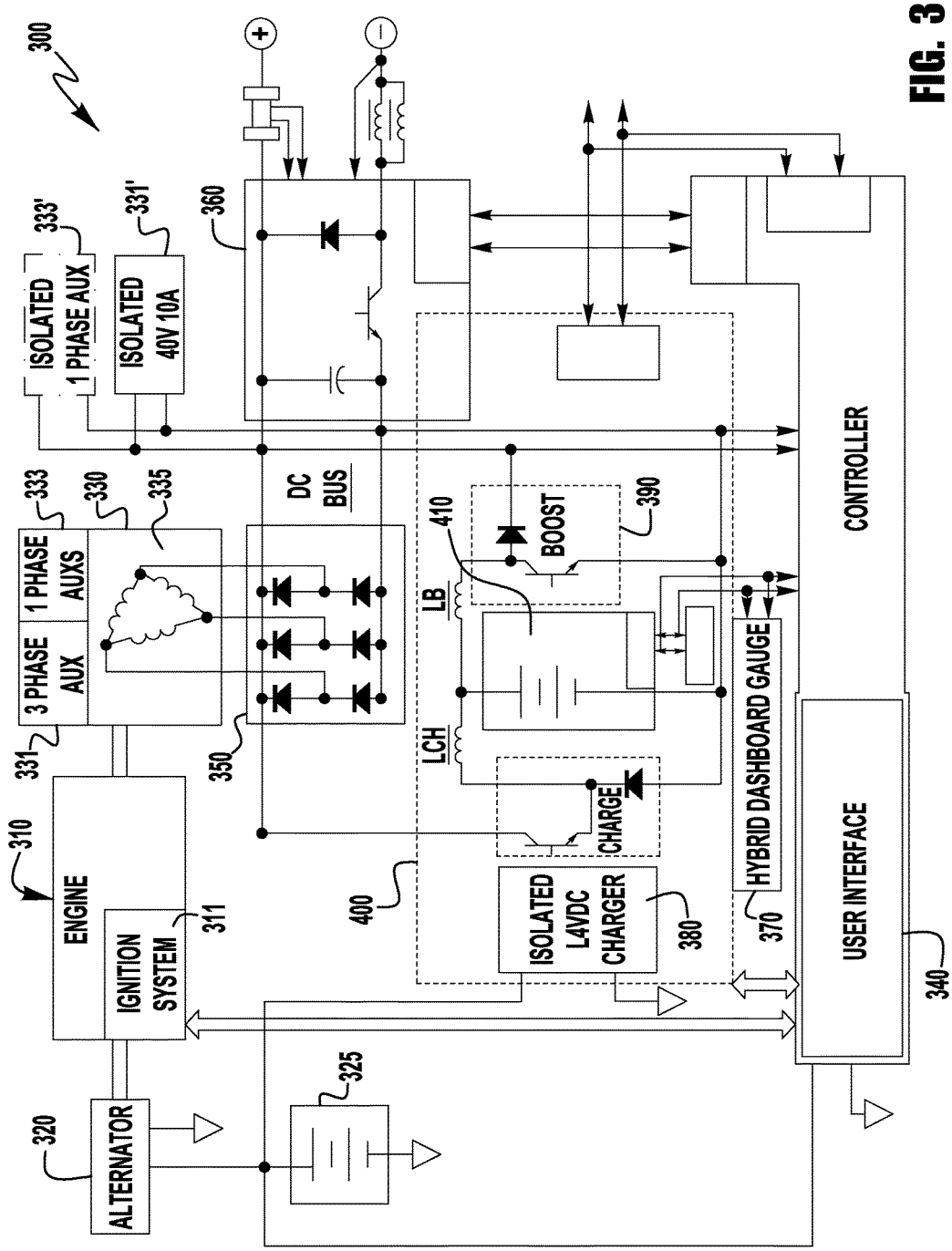
FIG. 3 is a diagrammatical representation of an electrical system of an exemplary embodiment of the present invention.

Turning now to FIG. 3 an exemplary embodiment of a hybrid engine system 300 of the present invention is shown. Like all hybrid engine systems, the system 300 contains an engine 310, which can be a gas or diesel powered engine. The engine 310 is coupled to an engine ignition system 311 which is used to start the engine. The engine 310 is mechanically coupled to an alternator 320 and a generator 330. The mechanical coupling can be made via a drive shaft or gearing, or other mechanical means. The alternator 320 is used to generate power during operation of the engine 320, where the power is used to provide charge to a 12 volt engine start battery 325, a controller/user interface circuit 340, and to the hybrid module 400, discussed more fully below. The generator 330 can be constructed similar to known generators, and in the embodiment shown has a 3-phase generation circuit 331, a single phase generation circuit 333 and a primary output power generation circuit 335. Each of the 3 and single phase generation circuits are used to generate auxiliary power signals which can be directed to auxiliary outlet power circuits 331' and 333', respectively. External auxiliary components, such as wire feeders, tools, compressors, lights, etc. can be coupled to the outlets 331' and 333' and be powered by the system 300 during operation. In exemplary embodiments, each of the outlets 331' and 333' are isolated for protection. The primary output power generation circuit 335 is used to generate the output power which can be used for the welding and/or cutting signal. This output power is directed a rectifier bridge 350 which rectifies the AC output from the circuit 335. The output from the rectifier bridge 350 is directed to an output circuit 360 which conditions/modifies the rectified power signal to a desired welding or cutting signal for a specific operation. The output circuit 360 can be a chopper, or any other known type of output circuit that can be used to provide the desired output signal. The output circuit 360 is also coupled to the controller/user interface 340, which is used to control the overall operation and function of the system 300. The controller/ user interface 340 uses user input data and its internal control logic and systems to control the operation of the system 300 and provide the desired output signals to be used for a welding/cutting operation, and any other function aspects of the system 300.

As shown in FIG. 3, the system 300 also includes a hybrid module 400. The module 400 contains a power generation energy storage device 410. The power generation storage device 410 is a high capacity storage device (battery) that can be a lithium ion type battery, or the like. In other exemplary embodiments, the storage device 410 can be a super capacitor, or a plurality of super capacitors which store an amount of energy needed for the functionality described below. The hybrid module 400 also contains an isolated charger system 380 which is used to charge the storage device 410 during operation of the engine 310. The charger 380 receives power from the alternator 320 when the engine is operating. A charge circuit 385 is provided between the isolated charger 380 and the storage device 410. Further, the module 400 can also include a power conditioning circuit 390, which can be a boost circuit, or the like, which conditions the power from the storage device 410 prior to providing the power to the outlets 331'/333', the output circuit 360 and/or the controller/user interface 340. As shown in FIG. 3, also coupled to the module 400 is a hybrid dashboard user interface 370. This can be included into the user interface/controller 340 are can be a separate user interface on the housing of the system 100. This user interface 370 can be used to determine the status of the storage device 410, the operation of the engine system, the status of the charging and the overall operation of the hybrid module 400.

As explained more fully below, the exemplary embodiment shown in FIG. 3 provides for improved performance and extended operational life of some of the components of the system 300, including the 12 volt battery 325.

As generally understood, in known systems a lead acid battery is used for starting/operating the engine and can be used as a storage device for providing output power during welding or cutting operations. However, voltages in the range of 60 to 80 VDC are often needed/desirable for striking an arc, pulse welding, whipping of a stick electrode, etc. This high power events/draws can appreciably reduce the usable life of lead acid batteries. However, starting an engine may often require at least 500 cold cranking amps from the battery system—which is often more than what the welding/cutting system may deliver. Thus, existing systems must make tradeoffs and compromises in the use of the energy storage devices—which can compromise their usable life. Embodiments of the present invention address these issues and provide an improved system.

As explained above, the system 300 uses a 12 VDC battery 325 to start the engine 310 in a similar fashion to known engine systems. The battery 325 can be a lead acid battery which is capable of providing the needed cold cranking amps for starting the engine 310. However, unlike other known systems, the system 300 uses the storage device 410 to power all of the remaining electrical components when the engine 310 is not running, and provide power to the DC bus for the output circuit 360 and the outlets 331' and 333' as needed. That is, when the engine is not running and the storage device has sufficient stored energy, the storage device 410 provides the power for the controller/user interface 340, the user interface 370, and any other controllers/loads within the system 300, thus relieving the power demands on the starting battery 325. This is unlike known system, in which the internal electronics and control systems often get their power from the same battery that is used to start the engine. This increases the demand on the battery and reduces its usable life.

The operation of an exemplary embodiment of the system 300 will now be explained. During a system off state, the controller 340 and any other low voltage loads within the system 300 (like a clock, etc.) are powered by the battery 325. This is to prevent draining of the storage device 410. At start up, the battery 325 provides the starting power for the engine 310 and power to the control electronics as the system 300 starts up. However, once the engine is started and running the controller 340 performs a system check and evaluates the state of charge of the storage device 410 and any current draw. So long as the storage device 410 has sufficient energy to satisfy the detected current draw, and control the internal electronics of the system 300, the control power for the system 300 is then drawn from the storage device 410. As indicated above, the storage device 410 can be a lithium-ion battery, or super capacitor(s), or storage devices off similar performance characteristics. Specifically, these storage devices have improved performance over lead acid batteries, having, for example, more charging cycles. In exemplary embodiments of the present invention, the storage device has a voltage in the range of 40 to 60 volts, and an amp hour rating in the range of 50 to 70 AH. In other exemplary embodiments, the storage device has a voltage in the range of 50 to 60 volts, and an amp hour rating in the range of 60 to 70 AH.

As shown in FIG. 3, the system 300 employs a construction which ensures that the storage device 410 provides all of the system control and operational power so long as the storage device 410 has a power level which is above a threshold amount. For example, in the embodiment shown a diode base electrical circuit is used such that so long as the storage device 410 can provide a voltage at a level above the voltage of the 12 volt battery 325, the power will be provided from the storage device 410. In an exemplary embodiment of the present invention, so long as the storage device 410 can provide a voltage of above a threshold level—which can be in the range of 14 to 16 volts—the control power for the controller 340, user interface, and any other control circuitry will come from the storage device 410. When the voltage supplied from the storage device drops below the threshold value, the control power will then come from the battery 325. This will ensure uninterrupted control power, and significantly reduce the power obligations of the battery 325—which will extend its life significantly, as compared to known systems.

The configuration shown in FIG. 3 can also provide operational flexibility to aid in improving the performance of the system 300. Specifically, the system 300 can have multiple different operational modes based on operational conditions and the status of some of the components of the system 300. In a first mode of operation, the system 300 is in a non-engine operational mode. In this mode of operation, the storage device 410 has sufficient stored energy to provide power for all of the demands placed on the storage device 410, including any welding/cutting load which receives the signal from the output circuit 360, any auxiliary loads receiving auxiliary power from either, or both, of the outlets 331' and 333', and the control power used by the controller/user interface 340 and any other control/operation power or loads within the system 300. In such a mode of operation, the engine 310 can be completely turned off, or can be running in a low idle mode of operation. A second mode of operation can be a high performance operation mode, which can provide the maximum power output for the system. In this mode of operation, the output power of the system (through the output circuit and/or the outlets) is provided by a combination of the engine/generator and the storage device 410. In such embodiments, the power from the generator 330 and the storage device 410 are provided to the DC bus, which are then directed to the loads of the system 300 (of course, some is also used for the controller, control electronics and user interface electronics, as described above). This is the least efficient mode of operation, as the engine is operating at an operational RPM speed, so fuel consumption is relatively high, as compared to other modes. A third mode of operation is an economy mode of operation. In this mode of operation, the storage device 410 provides the majority of the energy used by the system 300 for the output loads, and the control of the system, and the engine/generator combination is operating but at a reduced RPM level, so that the engine 310 is not consuming large amounts of fuel. In this mode of operation, the engine/generator is operating at a speed at which it provides in the range of 1 to 20% of the total power output and consumed by the system 300. In other exemplary embodiments, the system 300 will enter this mode of operation when the controller determines that the entire power demand of the system is below a threshold level. For example, the controller 340 can use the known power usage of the system 300 for control electronics, etc. and an anticipated or actual load demand for the auxiliary and primary (welding or cutting) loads, and if the total of this energy demand is below a certain threshold level the controller 340 determines that the economy mode is acceptable and operates the engine 310 at a low RPM to provide only the additional energy that may be needed. Further, if the controller 340 determines that the total demand is below a second threshold level, under which the storage device 410 can provide all of the necessary power for the external loads and internal controls, the controller 340 causes the engine to be turned off and the system 300 enters a battery only mode.

Thus, in exemplary embodiments, the controller 340 of the system 300 can have at least two operation threshold values, which can be either predetermined or based on system information monitored by the controller 340, which are used to determine the mode of operation. If the entire detected and/or anticipated power demand/load of the system 300 (which includes external loads and internal control loads) is below a first threshold level the system 300 is set in a battery only mode in which all of the power is provided from the storage device 410. In some exemplary embodiments, this threshold level is set at a point where the initial determined and/or detected energy demand is in the range of 70 to 95% of the energy that can be provided by the storage device at the start of the power demand. If the determined/anticipated power demand for the system 300 is above the first threshold but below a second threshold, the system 300 uses the storage device 410 to provide the majority of the power for the loads, but also uses the engine/generator combination to provide at least some of the power. However, in this mode the engine runs at a reduced RPM level, so as to be run as efficiently as possible. In exemplary embodiments, this second power demand threshold level can be predetermined and stored in the controller 340, while in other embodiments, this level can be determined by the controller 340 based on operational settings and parameters of the system 340 and/or the status and condition of the storage device 340. Further, the second threshold level can be set below the maximum determined energy output for the storage device 410. In such embodiments, this ensures that the engine 310 is running in providing power for situations in which the total load demand may spike above the power available to be provided by the storage device 410. For example, in some exemplary embodiments, the second power threshold is in the range of 80 to 100% of the energy available from the storage device 410. In other exemplary embodiments, the second threshold is in the range of 85 to 95% of the energy available from the storage device. Thus, when the anticipated/detected load is above the first threshold value, but below the second threshold value the storage device 410 will provide the majority of the energy needed with the engine running at least an idle speed to provide at least some energy available for the system loads. It is noted that during some operations, even though the engine is running, the power generator from the generator 330 may not be needed because all of the needed power will come from the storage device 410, but the engine can be running to provide energy for situations where it is likely that the energy demand may spike over the available energy of the storage device 410.

Finally, when the anticipated or detected total load exceeds the second threshold value the engine/generator is controlled such that it is running at a high RPM level (e.g., a normal operating RPM level) such that the generator 330 provide the majority of the energy being used by the system 300 for its external loads and internal controls, and the storage device 410 supplements the needed energy, as called for.

Thus, exemplary embodiments of the present invention optimize the efficiency of the system, while extending the life of the battery 325.

As referenced above the power/demand threshold levels can be predetermined operational levels that are preprogrammed in the controller 340 based on at least the storage device 410. However, as also described above, the threshold levels can be determined based on operational settings and detected conditions of the system 300. For example, the controller 340 can take into account the status and condition of the storage device 410, including conditions such as the age of the storage device 410 and its performance characteristics—including its recharge rate, etc. Thus, the controller 340 can take into account the condition and capabilities of the storage device to ensure that the performance of the system 300 is maintained throughout the life of the storage device 410. Further, as the storage device ages and its performance is compromised the controller 340 can provide an indication on a user interface indicating a condition of the storage device 340, so that a user can replace it as needed. Further, the controller can take into account user input information regarding the external loads that will be experienced during a given operation to determine at what level the thresholds should be such that the system 300 is capable of providing the proper amount of energy as needed. For example, if the auxiliary loads and the primary load on the output circuit 360 are determined to be relatively smooth or constant load types, which do not deviate or spike, etc. then the threshold levels can be adjusted appropriately. For example, with relatively constant power loads, the thresholds can be closer to the maximum energy capacity of the storage device 410 because the chances of energy spike that may exceed the capacity will be rare. This improves the overall efficiency of the system 300. However, if the user input information, such as process type (for example, gouging, pulse welding, etc.) indicates that there can be large swings in the energy demand or load, the threshold settings will be adjusted appropriately so that to ensure that an appropriate amount of energy is available as needed. For example, during processes which do not have relatively constant energy demands or may involve load spikes, the thresholds can be at a lower percentage related to the storage device 410 capacity to ensure that excess energy is available when needed. This may also prevent the need for the engine to turn on or increase in speed during load spikes, as excess capacity will be available.

Thus, in exemplary embodiments, the total energy/load demand can be determined based on user input information, and the threshold values can be determined on the condition of the system/storage device and the anticipated load/demand type—i.e., whether it will be a relatively constant load or a highly variable load.

In a further exemplary embodiment of the present invention, the system 300 has a fault mode of operation. In such a mode of operation, the controller 340 determines that there is a fault in the hybrid module 400 and/or the storage device 410. If such a fault is detected the control 340 uses only the engine/generator combination to provide the power utilized by the system 300 and for the external loads. In such a mode of operation, the system 300 can operate like traditional non-hybrid engine drive welders/power supplies. Further, when a fault is detected the controller 340 can cause a fault message to be displayed on a user interface to inform a user of the fault. Further, the controller 340 could cause all operations to be locked out or not made available for use, that would require the use of the storage device 410. For example, if a welding/cutting process required both power from the generator 330 and the storage device 410 to be properly executed, the controller 340 would prevent that process from being initiated and can provide an error message to the use.

While it is noted that the above discussion has primarily focused on welding and cutting operations, the system can be used for other operations and load types as well.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. An engine drive power supply, comprising:
 a combustion engine coupled to an electric generator which generates an output power when said combustion engine is operating, said electric generator coupled to a welding output circuit, where said welding output circuit generates a welding output power signal during a welding operation;
 a control electronics system having at least a controller and a user interface, where said control electronics system controls an operation of said engine drive power supply;
 a first energy storage device comprising an engine starting battery coupled to said control electronics system and said combustion engine; and
 a second energy storage device coupled to said control electronics and said welding output circuit, wherein the second energy storage device has a higher output voltage than the engine starting battery,
 wherein when said engine drive power supply is in a first state said first energy storage device provides all power used by said control electronics system and is used to provide all power to start said combustion engine,
 wherein when said engine drive power system is in a second state said second energy storage device provides all power used by said control electronics system and provides all power used by said welding output circuit to generate said welding output power signal, and
 wherein the engine starting battery does not supply power used by said welding output circuit to generate said welding output power signal.

2. The engine drive power supply of claim 1, wherein said engine drive power supply switches from said first state to said second state when said control electronics system determines that said second energy storage device has sufficient stored energy for a detected load on said second energy storage device.

3. The engine drive power supply of claim 1, wherein said engine starting battery is a 12 volt lead acid battery and said second energy storage device is a lithium ion battery.

4. The engine drive power supply of claim 1, wherein said higher output voltage is within a range of 40 to 60 volts, and the second energy storage device has an amp-hour rating in the range of 50 to 70 AH.

5. The engine drive power supply of claim 1, wherein in said second state said second energy storage device provides all power used by said engine drive power supply.

6. The engine drive power supply of claim 5, wherein in said second state said combustion engine is not operating or is in an idle state.

7. The engine drive power supply of claim 5, further comprising an auxiliary power circuit which is coupled to said second energy storage device and in said second state said second energy storage device provides all power to said auxiliary power circuit.

8. The engine drive power supply of claim 1, wherein in said second state said second energy storage device provides all power used by said engine drive power supply so long as said second energy storage device has a voltage above a threshold level.

9. The engine drive power supply of claim 8, wherein said threshold is in the range of 14 to 16 volts.

10. The engine drive power supply of claim 8, wherein said control electronics system turns on said combustion engine when a detected voltage of said second energy storage device falls below said threshold.

11. The engine drive power supply of claim 1, wherein when said engine drive power supply is in a third state said second energy storage device provides a majority of the power used by said engine drive power supply and said electric generator provides the remainder of the power used by said engine drive power supply.

12. The engine drive power supply of claim 1, wherein said second energy storage device does not provide any power to said engine drive power supply when a fault is detected with said second energy storage device.

13. An engine drive power supply, comprising:
 a combustion engine coupled to an electric generator which generates an output power when said combustion engine is operating, said electric generator coupled to a welding output circuit, where said welding output circuit generates a welding output power signal to be used by a load;
 a control electronics system having at least a controller and a user interface, where said control electronics system controls an operation of said engine drive power supply;

a first battery coupled to said control electronics system and said combustion engine, where said first battery is a 12 volt battery; and a second battery coupled to said control electronics and said welding output circuit, where said second battery has a voltage in the range of 40 to 60 volts and an amp-hour rating in the range of 50 to 70 AH, wherein when said engine drive power supply is in a first state said first battery provides all power used by said control electronics system and is used to provide all power to start said combustion engine, wherein when said engine drive power system is in a second state said second battery provides all power used by said control electronics system and provides all power used by said welding output circuit to generate said welding output power signal;

wherein said engine drive power supply switches from said first state to said second state when said control electronics system determines that said second battery has sufficient stored energy for a detected load on said second battery, and wherein the first battery does not supply power used by said welding output circuit to generate said welding output power signal.

14. The engine drive power supply of claim 13, wherein in said second state said second battery provides all power used by said engine drive power supply.

15. The engine drive power supply of claim 14, wherein in said second state said combustion engine is not operating.

16. The engine drive power supply of claim 14, further comprising an auxiliary power circuit which is coupled to said second energy storage device and in said second state said second energy storage device provides all power to said auxiliary power circuit.

17. The engine drive power supply of claim 14, wherein in said second state said second energy storage device provides all power used by said engine drive power supply so long as said second energy storage device has a voltage above a threshold level.

18. The engine drive power supply of claim 17, wherein said control electronics system turns on said combustion engine when a detected voltage of said second energy storage device falls below said threshold.

19. An engine drive power supply, comprising:

a combustion engine coupled to an electric generator which generates an output power when said combustion engine is operating, said electric generator coupled to a welding output circuit, where said welding output circuit generates a welding output power signal to be used by a load;

a control electronics system having at least a controller and a user interface, where said control electronics system controls an operation of said engine drive power supply;

a first energy storage device comprising an engine starting battery coupled to said control electronics system and said combustion engine; and a second energy storage device coupled to said control electronics and said welding output circuit and having a higher voltage than said engine starting battery, wherein when said engine drive power supply is in a first state said first energy storage device provides all power used by said control electronics system and is used to provide all power to start said combustion engine, wherein when said engine drive power system is in a second state said second energy storage device provides power used by said control electronics system and provides power used by said welding output circuit to generate said welding output power signal, and wherein said combustion engine runs at an idle speed;

wherein when said engine drive power system is in the second state and an anticipated power demand on said second energy storage device exceeds a threshold level said combustion engine has an RPM speed increased to an operating speed greater than the idle speed, and wherein the engine starting battery does not supply power used by said welding output circuit to generate said welding output power signal.

* * * * *